US 007788654B2

(12) United States Patent
Kostoulas et al.

(10) Patent No.: US 7,788,654 B2
(45) Date of Patent: Aug. 31, 2010

(54) METHOD FOR CONSTRUCTION OF A LINEAR-SIZED VALIDATION-PLAN OF W3C XML SCHEMA GRAMMARS

(75) Inventors: Margaret Gatatzes Kostoulas, Belmont, MA (US); Moshe E. Matsa, Cambridge, MA (US); Eric Perkins, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 1045 days.

(21) Appl. No.: 11/465,821

(22) Filed: Aug. 21, 2006

(65) Prior Publication Data

US 2008/0046453 A1 Feb. 21, 2008

(51) Int. Cl.
*G06F 9/45* (2006.01)
(52) U.S. Cl. .................. 717/151; 717/105; 717/109; 717/116
(58) Field of Classification Search .................. 717/151
See application file for complete search history.

(56) References Cited

U.S. PATENT DOCUMENTS

| | | | |
|---|---|---|---|
| 7,134,072 B1 * | 11/2006 | Lovett et al. | 715/234 |
| 7,366,729 B2 * | 4/2008 | Vincent, III | 707/101 |
| 2004/0073870 A1 * | 4/2004 | Fuh et al. | 715/513 |
| 2004/0194057 A1 * | 9/2004 | Schulte et al. | 717/114 |
| 2007/0250766 A1 * | 10/2007 | Medi et al. | 715/513 |

OTHER PUBLICATIONS

IBM Systems Journal, vol. 45, No. 2, 2006, "Generation of efficient parsers through direct compilation of XML Schema grammars," E. Perkins, M. Matsa, M.G. Kostoulas, A. Heifets, and N. Mendelsohn. pp. 1-20.

* cited by examiner

*Primary Examiner*—Thomas K Pham
(74) *Attorney, Agent, or Firm*—Cantor Colburn LLP; Edwin Choi

(57) ABSTRACT

A method for constructing a highly optimized linear-sized validation plan, the method comprising: providing a schema having a plurality of schema components; compiling the schema in three stages: a first stage in which the schema is read and modeled in terms of abstract schema components; a second stage in which the schema components are augmented with a set of derived components and properties by (i) synthesizing content models from the plurality of schema components by adding additional components including one or more synthetic content-model components and one or more synthetic elements and one or more synthetic types to the one or more of the plurality of schema components and (ii) computing the derived set of properties on the components; and a third stage in which the schema is traversed in order to generate recursive-descent validation code for each of the plurality of schema components by generating the highly optimized linear-sized validation plan directly from the plurality of schema components.

16 Claims, 4 Drawing Sheets

METHOD FOR CONSTRUCTION OF A LINEAR-SIZED VALIDATION-PLAN OF W3C XML SCHEMA GRAMMARS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to XML (Extensible Markup Language) Schema, and particularly to a method for constructing a linear-sized validation plan of W3C (World Wide Web Consortium) XML Schema Grammars.

2. Description of Background

Existing techniques for optimized parsing and validation leverage widely known optimization methods by converting a given grammar into forms of well-understood finite state machines. The content-model definition language of XML (Extensible Markup Language) Schema, however, is not easily converted into such structures. Content models defined in XML Schema can compactly represent a wide array of content-model constraints. In particular, three styles of composition (i.e., sequence, choice, and all) are supported, as well as arbitrary occurrence bounds. The expressivity of this model allows the creation of highly complex content models in a relatively compact form. This complexity is at odds with the traditional models. Particles composed with the "all" compositor, for example, result in a combinatorial explosion of states in such graphs, and simple occurrence ranges are represented with a state for each iteration of a repetition.

While many of the excess states in the finite-state model may eventually collapse into a relatively simple execution plan, their construction and optimization wastes computing and memory resources during compile time, and potentially prevents completion of the compile. Furthermore, if the optimizations are poorly implemented, artifacts of the blowup may appear in the final execution plan, affecting runtime performance. Considering the limitations of these finite-state models, it is desirable, therefore, to formulate a method for constructing a linear-sized validation plan of W3C (World Wide Web Consortium) XML Schema Grammars.

SUMMARY OF THE INVENTION

The shortcomings of the prior art are overcome and additional advantages are provided through the provision of a method for constructing a highly optimized linear-sized validation plan, the method comprising: providing a schema having a plurality of schema components; compiling the schema in three stages: a first stage in which the schema is read and modeled in terms of abstract schema components; a second stage in which the schema components are augmented with a set of derived components and properties by (i) synthesizing content models from the plurality of schema components by adding additional components including one or more synthetic content-model components and one or more synthetic elements and one or more of the plurality of schema components and (ii) computing the derived set of properties on the components; and a third stage in which the schema is traversed in order to generate recursive-descent validation code for each of the plurality of schema components by generating the highly optimized linear-sized validation plan directly from the plurality of schema components.

The shortcomings of the prior art are overcome and additional advantages are provided through the provision of a computer program product for constructing a highly optimized linear-sized validation plan, the computer program product comprising: a storage medium readable by a processing circuit and storing instructions for execution by the processing circuit for performing a method comprising: providing a schema having a plurality of schema components; compiling the schema in three stages: a first stage in which the schema components are read and modeled in terms of abstract schema components; a second stage in which the schema is augmented with a set of derived components and properties by (i) synthesizing content models from the plurality of schema components by adding additional components including one or more synthetic content-model components and one or more synthetic elements and one or more synthetic types to the one or more of the plurality of schema components and (ii) computing the derived set of properties on the components; and a third stage in which the schema is traversed in order to generate recursive-descent validation code for each of the plurality of schema components by generating the highly optimized linear-sized validation plan directly from the plurality of schema components.

Additional features and advantages are realized through the techniques of the present invention. Other embodiments and aspects of the invention are described in detail herein and are considered a part of the claimed invention. For a better understanding of the invention with advantages and features, refer to the description and the drawings.

TECHNICAL EFFECTS

As a result of the summarized invention, technically we have achieved a solution that provides for a method for constructing a linear-sized validation plan of W3C (World Wide Web Consortium) XML Schema Grammars.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
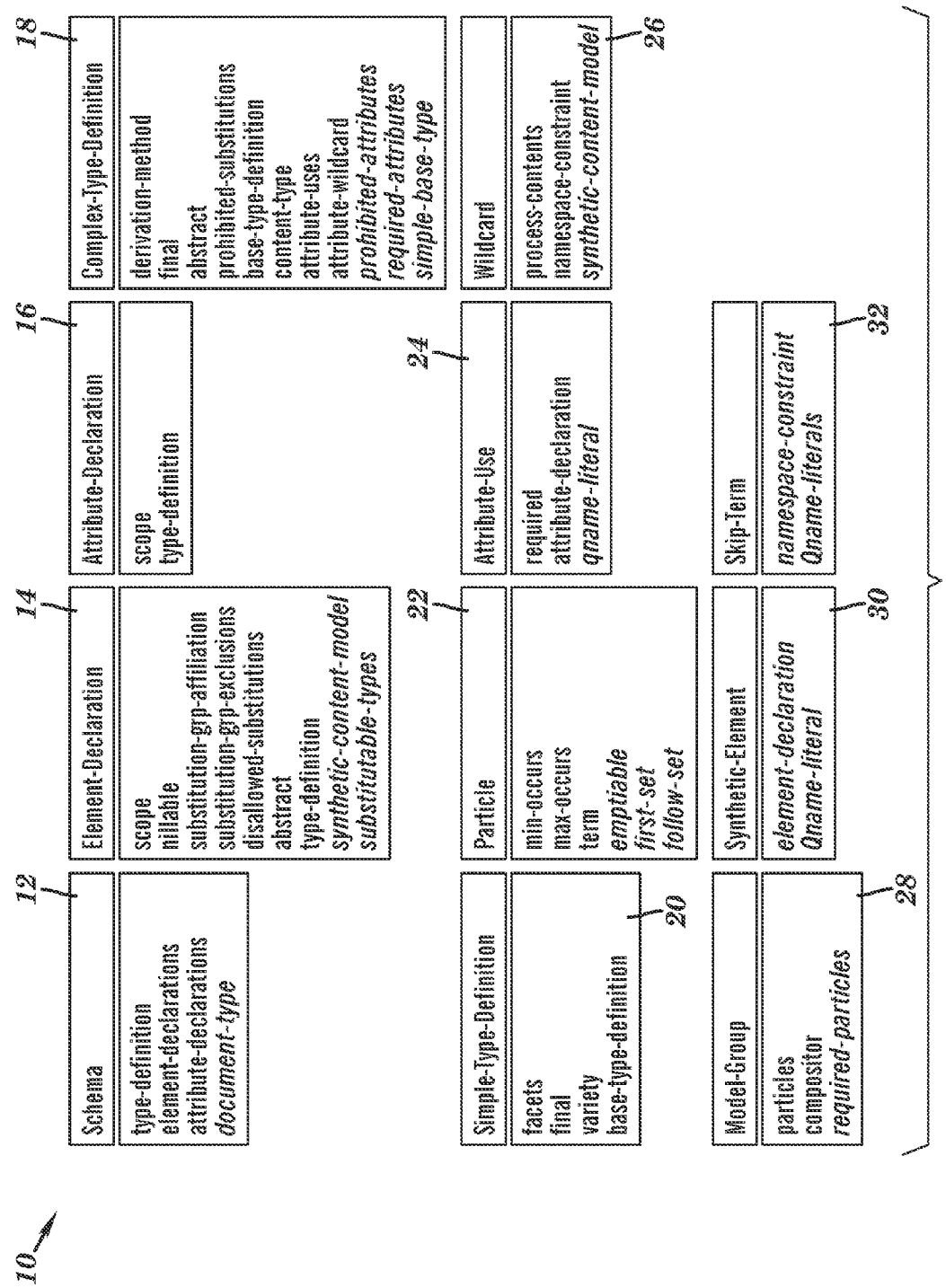
FIG. 1 illustrates one example of schema components.

One aspect of the exemplary embodiments is a method for modeling intermediate representations on the schema constructs themselves, and generating an execution plan directly off those components. This results in a predictable mapping between schema size and complexity, and the size and complexity of the execution plan described in the exemplary embodiments, and allows each schema construct to be treated in an optimized fashion. This both eliminates the compiler overhead of state construction and optimization, and also ensures that no blowup makes its way into the final execution plan.

The structure of an XML (Extensible Markup Language) document constrained by a schema cannot be decomposed, from a validation standpoint, below the tag level. Because meta-markup, such as namespace and xsi:type declarations, is contained in conceptually unordered attributes, no conclusive information about the document can be inferred until the entire tag is read. Thus, no exchange of information between the scanner and the validation logic can be made to refine the scanning of the rest of the tag, without possibly having to back up and correct mistaken assumptions. As a result, the grammar must not direct scanning at a granularity any finer than the tag. Accordingly, the generated validation logic may be cleanly separated from the scanning infrastructure, at the tag level, without loss of any significant performance opportunity. Thus, the generated parser is divided into two logical layers, a scanning layer and a validation layer.

The validation layer is a generated recursive-descent parser that drives the scanner using compiled, predictive knowledge from the schema. The scanning layer consists of a set of fixed XML primitives that scan content at the byte level, at the direction of the validation layer.

The validation logic is produced directly from the schema component model, using component-specific code templates for the various components in the schema. This approach is enabled by a constraint on valid schemas ensuring that all content models are deterministic. This constraint is called the Unique Particle Attribution (UPA) constraint, and is satisfied by a content model that is formed such that during validation of an element information item sequence, the particle component (contained directly, indirectly or implicitly therein) with which each item in the sequence is validated, can in turn be uniquely determined without examining the content or attributes of that item, and without any information about the items in the remainder of the sequence. This constraint ensures that transitions between particles in the content model are deterministic.

The compilation procedure takes place in three stages. The input schema is first read in, and modeled in terms of abstract schema components. The complete schema is then augmented with a set of derived (calculated) components and properties used to drive code generation. Finally, the schema is traversed, in a recursive-descent fashion, to generate the validation code for each component.

To represent and operate on the XML Schema grammar, as well as verify validity of the schema constraints, a publicly available implementation of the schema components is used. The schema components, taken in aggregate, are referred to as the schema. It is assumed that the schema for any given grammar is fully resolved before compilation begins, i.e. there are no missing subcomponents, and no attempt will be made to further resolve components.

FIG. 1 shows the set of schema components, with their compilation annotations in italics, as well as two special components (synthetic-element and skip-term). The set of schema components 10 includes a schema block 12, an element-declaration block 14, an attribute-declaration block 16, a complex-type-definition block 18, a simple-type-definition block 20, a particle block 22, an attribute-use block 24, a wildcard block 26, a model-group block 28, a synthetic-element block 30, and a skip-term block 32. For instance, the schema block 12 includes the schema component properties type-definition, element-declarations, attribute-declarations, and the compilation annotation document-type.

Top-level schema components have four primary component types: element and attribute declarations, complex and simple type definitions. Complex type definitions also reference a set of helper components: particle, model-group, wildcard, and attribute-use.

Complex types may have content that is simple, complex, or empty. In the case where the content is simple, the value of the content-type property is a simple-type-definition that defines the content. In the case where the content is empty, the content-type value is empty. If the complex type has complex content, then the content-type is a particle, which defines a complex content model. The content model for such a complex type is defined in terms of the helper components (particles, model-groups, and wildcards).

Particles and model-groups structure the content model for validating element content, which is eventually validated by element declarations or wildcards. The basic unit of the content model is the particle. A particle is a term in the grammar for element content, consisting of either an element declaration, a wildcard or a model group, together with occurrence constraints. Particles contribute to validation as part of complex type definition validation, where they allow anywhere from zero to many element information items or sequences thereof, depending on their contents and occurrence constraints.

A particle has a pair of occurrence constraints, min-occurs and max-occurs, and a term. The term of a particle can be an element declaration, a model-group or a wildcard. Model groups, in turn, compose groups of particles, using one of three composition models (xsd:sequence, xsd:choice, xsd:all). These components can be combined freely, within the constraints of the Unique Particle Attribution constraint, as discussed above. Note that in order to facilitate processing, the XML Schema recommendation places extra restrictions on the use of model-groups with the xsd:all compositor.

Because of the open-ended composition model of XML Schema, the schema components as defined by the specification lack explicit representations of validation constraints that reference the schema globally. In particular, the content model for wildcards, element substitution groups, and the content model for the document itself all make implicit references to the global element declarations of the schema, without enumerating them. In the compiler, these implicit validation rules are rendered explicitly with content models synthesized from the standard schema components and the global properties of the schema. These synthetic content models are represented with the normal schema components, and with two additional synthetic components.

In contrast to a DTD (Document Type Definition), XML Schema provides no standard way to indicate the content model for the document itself. The validation rule for the document element, unless the root is otherwise specified, is normally taken to be similar to that of a wildcard, matching any global element. To represent this, a virtual top-level type for the content of the document is defined. This top-level type is a complex type called documentType, and is defined within a private namespace. Unless otherwise stipulated, the documentType is assumed to take a form similar to that of xsd:anyType, but somewhat more restrictive in that it bears no attributes, forces strict processing, and does not allow mixed content.

Element substitution groups allow for the substitution of one named element for another. Any global element declaration may serve as the head of a substitution group, and any element with a properly derived type may declare itself to be substitutable for the head element.

Figure 2:
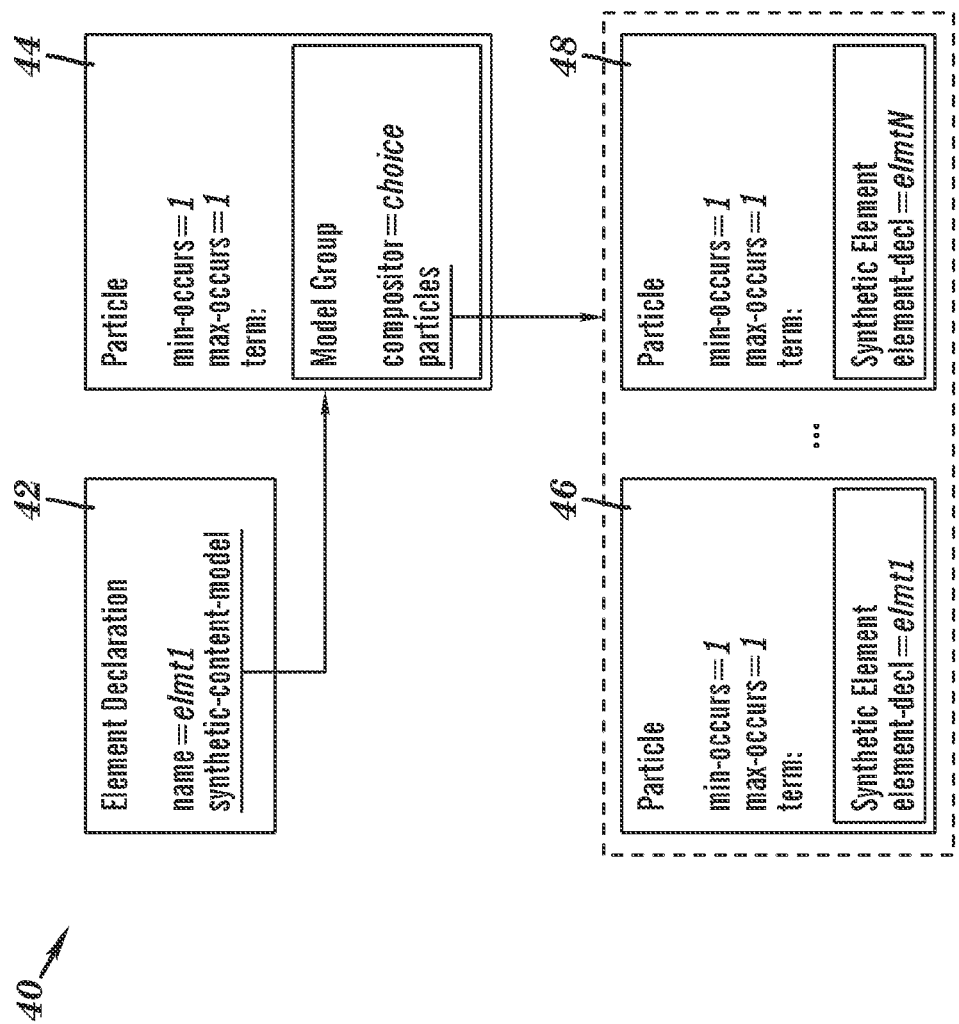
FIG. 2 illustrates one example of an element with a synthetic content model.

In a fixed schema, the validation rule for an element substitution group acts as a choice over the appropriate element declarations. To represent this explicitly in the compiler, the element declaration component is augmented with a synthetic-content-model property that represents the expanded form of the element declaration (FIG. 2). FIG. 2 illustrates one example of an element synthetic-content model 40. The element synthetic-content-model 40 includes an element declaration block 42, a particle block 44 (with a choice model group as its term), a particle block 46 (with one synthetic element term), and a particle block 48 (with a synthetic element term). Also, note that particle block 48 may be a sequence of particle blocks each with a synthetic element term. Each of these synthetic element terms represent an element declaration that could be substituted for this element.

This new content model is a choice over any elements that could transitively appear in the substitution group headed by this element. In order to distinguish an element declaration (which is always considered to be the head of a substitution group) from the terms of this synthetic choice, a synthetic component called the Synthetic-Element is defined, which like regular element declarations, wildcards and model groups may be the term of any particle. The Synthetic-Element, as opposed to the regular element declaration, validates only the declared element, and not any of its substitution group members.

Figure 3:
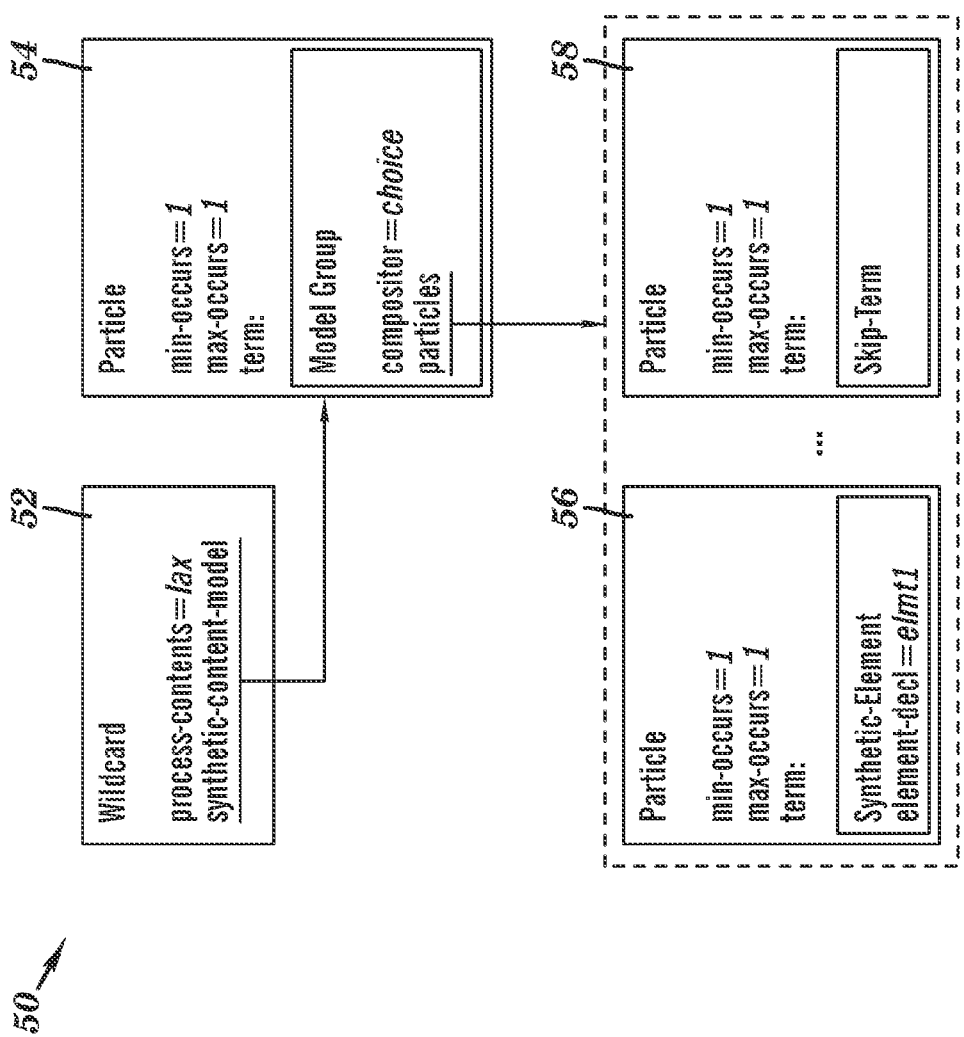
FIG. 3 illustrates one example of a wildcard with a synthetic content model.

The content model for wildcards is similarly implicit, as shown in FIG. 3. FIG. 3 illustrates one example of a wildcard synthetic-content model 50. The wildcard synthetic-content model 50 includes a wildcard block 52, a particle block 54 (with a choice model group as its term), a particle block 56 (with a synthetic element term), and a particle block 58 (with a skip term). Also, note that particle block 58 may be a sequence of particle blocks each with a skip term.

The structure of the validation rule for a wildcard depends on the value of its process-contents property. When skip processing is stipulated, the processor is required to skip over the matching element, and all of its content, without any validation. When strict processing is stipulated, the matching element must be validated with one of the global element declarations in the schema. Lax processing combines the two options, requiring full validation of known elements, but allowing skip processing for unknown elements. In all cases, the matching element satisfies the namespace constraint specified on the wildcard component.

In the compiler, the validation rule for a wildcard is represented with a choice similar to that used for element substitution groups. This is assigned to the synthetic-content-model property of the wildcard. Skip processing is represented with a special synthetic component, the Skip-Term. If the process-contents property is strict or lax, the choice contains a particle with a Synthetic-Element term for each global element declaration that satisfies the namespace constraint. If the process-contents property is skip or lax, the model-group also contains a particle with a Skip-Term.

Once the schema is fully resolved, the derived properties may be computed. These properties form the basis for the code generation phase that follows. Because several of the properties represent global information about the schema, such as the complete set of global elements matching a wildcard component, the derived properties must all be computed before code generation begins. The properties are calculated in order, since the calculations of one step are used in subsequent steps. Note that the calculation procedures implicitly assume that the schema is valid with respect to all of the constraints on schema components in the XML Schema specification.

The substitutable-types property of an element-declaration defines the set of types that can appear in the instance document, by using the xsi:type dynamic typing mechanism, instead of the declared type. The substitutable-types set contains all global types, including the declared type itself, that possess the following characteristics: they are not anonymous or abstract, they are transitively derived from the declared type, and they do not, at any step of derivation, violate the prohibited-substitutions properties of the element-declaration and type-definition. In the generated parser, the substitutable types set is used to validate the value of any xsi:type attributes that may appear in the document.

In validating an XML document, a correspondence is made between literal element and attribute names and QNames found in the schema. To make this correspondence, a symbol called the QName-literal is defined. A QName-literal may represent a specific QName referenced in the schema, or some unbounded set of QNames not directly referenced in the schema, but indirectly referenced by a wildcard. Additionally, special QName-literals are used for the close-tag and the end-of-file symbols. At the abstract level, validation constructs are considered to validate sets of QName-literals in the case of attributes, or sequences of QName-literals in the case of content models.

Figure 4:
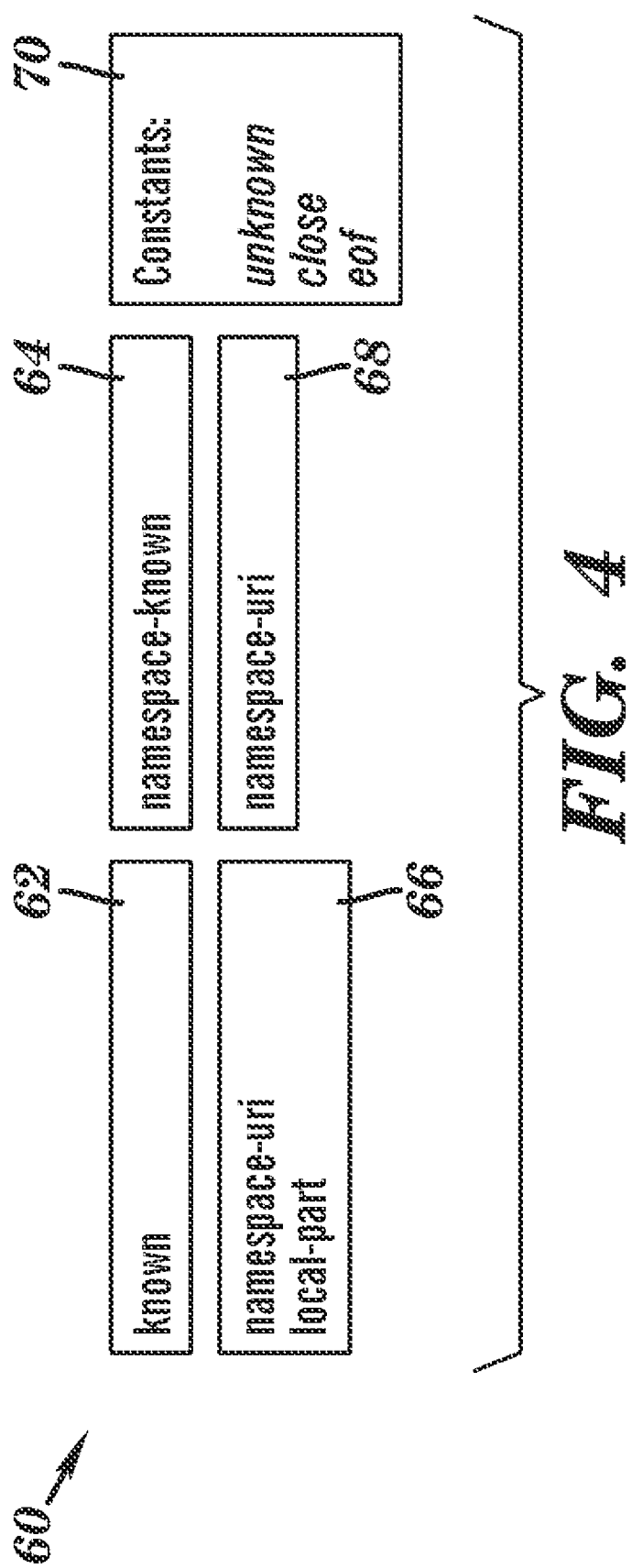
FIG. 4 illustrates one example of QName-literal symbols.

A QName-literal can have one of several forms, as shown in FIG. 4. FIG. 4 illustrates one example of QName-literal symbols 60. These may be a known QName-literal 62, a namespace-known QName-literal 64, and one of three constant QName-literal symbols 70. If the QName-literal is a known symbol then it carries two parts of information 66: a namespace-uri datum and a local-part datum. If the QName-literal is a namespace-known symbol, then it carries one piece of information 68: a namespace-uri datum. The three constant QName-literal symbols are unknown, close, and end-of-file or eof, as shown in box 70.

A QName explicitly referenced in the schema is represented by the known QName-literal, which is the {namespace-uri, local-part} pair. An unknown QName in a known namespace is represented by a namespace-known QName-literal, with a single property, the namespace-uri. QNames with an unknown namespace are represented by the special singleton unknown QName-literal, regardless of their local-part. Close tags, regardless of their name, are all represented by the special close QName-literal. Similarly, the end-of-file is represented by the eof QName-literal.

Note that the set of known QName-literals is considered to be established completely before compilation begins, and that unknown and namespace-known QName-literals are not used to refer to known QNames. Thus, an element wildcard may validate known, namespace-known, and unknown QName-literals.

Every particle in the schema has three calculated properties: emptiable, first-set, and follow-set. These properties define the relationship between the schema component and the QName-literal sequence it will validate. The emptiable property corresponds to the Particle Emptiable definition of the XML Schema recommendation, and determines whether or not the particle can validate the empty QName sequence. The emptiable property is used to calculate the other particle properties below.

The first-set of a particle defines the set of QName-literals that can occur in the first position of an element QName-sequence that is validated by the particle. The first set is used to build control-flow logic for the content model; as a direct result of the Unique Particle Attribution constraint, comparison of an input QName-literal to the calculated first-set of a particle immediately determines whether or not that particle validates the input sequence. The first-set is calculated recursively, in a single pass over the schema.

The follow-set of a particle defines the set of QName-literals that can follow a QName-literal sequence validated by that particle. The follow-set is used to drive context-sensitive tag scanning. After the first-set is calculated for every particle, the follow-set is calculated in a second pass over the schema components, using the first-set of adjacent components.

For each complex type two sets of attribute QName-literals are calculated, required and prohibited. These sets are used to validate the attribute occurrence constraints. The required set includes the attribute QName-literals that are required to appear in the input tag. The prohibited set includes the attribute QName-literals that are not allowed to appear in the input tag.

The required and prohibited sets are created from information in the attribute uses of the complex type. Entries for attribute wildcards are also included, in the form of known QName-literals, namespace-known QName-literals and the unknown QName-literal, depending on the wildcard's process-contents value.

The generated parser consists of modules validating each type in the input schema, including the synthetic documentType. The validation logic is produced directly from the schema component model representation of each type. Validation code for simple types is largely independent of the input schema, and in the exemplary embodiments of the present invention, it consists mostly of library code.

For every complex type a recursive-descent parse function is defined that parses all the attributes and content of the complex type. To validate element content in a complex type, the element dispatch function is also defined. This function handles element-specific validation constructs such as defaulting and nillability, as well as dynamic typing, and dispatches a call to the actual type's parse function. Together, the type parse functions and element dispatch functions make up the whole validation engine.

The main entry-point of the generated parser is the parse function for the documentType. Starting with the parse function for the documentType, control passes back and forth between parse and dispatch functions, descending through the different types in the schema.

The validation logic for complex content is generated by mapping the various schema components in the content model to code templates. The templates, like the components themselves, are composable. For any component type, there is at least one generic template that will produce validation code for that component. In addition, there may be several optimized templates tailored for common, simple use cases. Using optimized code templates for common use cases helps to minimize the size of the generated code, and results in highly optimized validation logic.

Templates for the content model schema components are described below, and one is presented in pseudo-C code. In the templates, compile-time substitutions are often made. They are indicated as follows:

COMPILE[x] marks the insertion of the compiled code for the schema-component specified by x, relative to the current schema-component.

ID[x] represents a constant for the QName-literal x.

SET[x] represents a constant set for the given QName-literal-set.

SET_CASE[x] represents a series of switch cases (all with the same body) for each of the QName-literals in x.

IF[x] indicates a conditional section of the template that is evaluated at compile time.

READ_TAG[x] is used to mark the insertion of the appropriate read-tag primitive for the QName-literal set x.

READ_SIMPLE_CONTENT[x] marks the insertion of the appropriate read-content function for the simple type specified by x.

DISPATCH[x] represents a call to the dispatch function to validate the type of the element declaration x.

In the exemplary embodiments of the present invention, all comparisons of QName-literal sets have been implemented as bit-vector operations. At compile time, the literal bit vectors are calculated, and at runtime, the instance literals are compared against the set in bulk.

A number of templates may be utilized by one skilled in the art to create a highly optimized linear-sized validation plan. One such template is a particle template. Particle templates handle occurrence constraints. They must also handle emptiability, which interacts with the min-occurs property. A generic particle template is as follows:

```
int count = 0;
label: while (count < max) {
    if (!SET[first_set].contains(current_tag))
        break label;
    COMPILE[term];
    count++;
}
IF[!emptiable] { if (count < min) Fail( ); }
```

In addition, various optimized templates may be created for specific common cases. For instance, common cases with obvious template implementations include an unbounded particle with maxOccurs="unbounded", an optimized template for optional particles (particles that have maxOccurs=1, and are emptiable), fixed-repeat particles (particles that have minOccurs=maxOccurs and are not emptiable), simple particles (particles that have minOccurs=maxOccurs=1), and degenerate particles (particles that have minOccurs=maxOccurs=0).

The generic template for model-groups with compositor xsd:sequence is a sequence of substitutions. There is no need for optimized templates. The generic template for a choice is a simple switch statement. An optimized template for a choice with two particles simplifies the switch to the more efficient if-else clause. A choice with only one particle is a direct substitution of that particle. In addition, all-group templates make use of a set to check occurrence constraints. The set is checked at runtime against the set of required particles. The required-particles set contains an entry for each particle in the model-group that has a minOccurs property value of 1. The entries in the set are one-based indices into the list of particles. An optimized template for all-groups with no required-particles does not need the final test for the existence of all required-particles. As with choice, an all-group with exactly one particle is a direct substitution of that particle. As with sequence, an all-group with no particles validates the empty sequence. The template is therefore a no-op.

Furthermore, concerning element declarations and wildcards, validation code for element declarations and wildcards is produced by their synthetic-content models. Synthetic-elements validate exactly one element. The content model for a skip term, which is used by the synthetic-content-model of skip and lax wildcards, repeatedly calls the scanner to scan through one well-formed element.

The template for complex types is composed of a header that handles attributes and xsi:nil, and a body that handles content. The header template is the same for all complex types. Note that in the special case of the documentType, the template is modified to compare the final tag against the end-of-file QName-Literal rather than the close QName-Literal. The body template for complex types with simple content uses the simple-base-type, which is the complex type's nearest ancestor of simple type. The body template for complex types with empty content simply comprises a call to a scanner primitive to read a close tag.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for constructing a highly optimized linear-sized validation plan on a computing device, the method comprising:
   providing to the computing device an XML schema having a plurality of XML schema components;
   compiling the XML schema on the computing device in three stages:
      a first stage in which the XML schema is read and modeled in terms of abstract schema components;
      a second stage in which the XML schema components are augmented with a set of derived components and properties to form an augmented XML schema by (i) synthesizing content models from the plurality of XML schema components by adding additional XML components including one or more XML synthetic content-model components and one or more XML synthetic elements and one or more XML synthetic types to the one or more of the plurality of XML schema components and (ii) computing the derived set of properties on the XML components; and
      a third stage in which the augmented XML schema is traversed in order to generate recursive-descent validation code for each of the plurality of XML schema components by generating the highly optimized linear-sized validation plan directly from the plurality of XML schema components.

2. The method of claim 1, wherein the one or more synthetic XML content-model properties are located in an element declaration schema component.

3. The method of claim 1, wherein the one or more XML synthetic elements only validate a declared element.

4. The method of claim 1, wherein the XML schema includes QNames.

5. The method of claim 4, wherein a QName-literal represents a QName referenced in the XML schema.

6. The method of claim 4, wherein a QName-literal represents an unbounded set of QNames not directly referenced in the XML schema.

7. The method of claim 1, wherein the highly optimized linear-sized validation plan is generated via templates.

8. The method of claim 7, wherein highly optimized validation templates are used in many common use cases.

9. A computer program product for constructing a highly optimized linear-sized validation plan, the computer program product comprising:
   a storage medium readable by a processing circuit and storing instructions for execution by the processing circuit for performing a method comprising:
      providing an XML schema having a plurality of XML schema components;
      compiling the XML schema in three stages:
         a first stage in which the XML schema components are read and modeled in terms of abstract schema components;
         a second stage in which the XML schema is augmented with a set of derived components and properties to form an augmented XML schema by (i) synthesizing content models from the plurality of XML schema components by adding additional components including one or more synthetic XML content-model components and one or more synthetic XML elements and one or more synthetic XML types to the one or more of the plurality of XML schema components and (ii) computing the derived set of properties on the components; and
         a third stage in which the augmented XML schema is traversed in order to generate recursive-descent validation code for each of the plurality of XML schema components by generating the highly optimized linear-sized validation plan directly from the plurality of XML schema components.

10. The computer program product of claim 9, wherein the one or more synthetic XML content-model properties are located in an element declaration schema component.

11. The computer program product of claim 9, wherein the one or more synthetic XML elements only validate a declared element.

12. The computer program product of claim 9, wherein the schema includes QNames.

13. The computer program product of claim 12, wherein a QName-literal represents a QName referenced in the schema.

14. The computer program product of claim 12, wherein a QName-literal represents an unbounded set of QNames not directly referenced in the schema.

15. The computer program product of claim 9, wherein the highly optimized linear-sized validation plan is generated via templates.

16. The computer program product of claim 15, wherein highly optimized validation templates are used in many common use cases.

* * * * *